(12) United States Patent
Matschullat

(10) Patent No.: US 8,491,836 B2
(45) Date of Patent: *Jul. 23, 2013

(54) METHOD AND FURNACE FOR MELTING STEEL SCRAP

(75) Inventor: Thomas Matschullat, Eckental (DE)

(73) Assignee: Siemens Aktiengesellschaft, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/369,556

(22) Filed: Feb. 9, 2012

(65) Prior Publication Data

US 2012/0140786 A1 Jun. 7, 2012

Related U.S. Application Data

(62) Division of application No. 12/308,600, filed as application No. PCT/EP2007/055649 on Jun. 8, 2007, now Pat. No. 8,137,432.

(30) Foreign Application Priority Data

Jun. 28, 2006 (DE) .......................... 10 2006 029 724

(51) Int. Cl.
*H05B 7/20* (2006.01)
*H05H 1/26* (2006.01)

(52) U.S. Cl.
USPC .......... 266/218; 373/22; 373/24; 219/121.37; 219/121.48

(58) Field of Classification Search
USPC .......................... 266/218; 219/121.37, 121.48
See application file for complete search history.

(56) References Cited

U.S. PATENT DOCUMENTS 7,910,048 B2 * 3/2011 Jurewicz et al. ............. 266/192

FOREIGN PATENT DOCUMENTS

JP 2003168595 A * 6/2003

OTHER PUBLICATIONS

Machine translation of JP 2003-168595 A by Terajima et al, published Jun. 13, 2003.*

* cited by examiner

*Primary Examiner* — George Wyszomierski
*Assistant Examiner* — Tima M McGuthry Banks

(57) ABSTRACT

A melting furnace for smelting scrap includes a heating device extending through a wall of the furnace in order to supply melting energy, wherein the heating device including a tubular body, which encloses a flow channel. Further, the furnace includes a heating zone formed by a longitudinal section of the tubular body configured as an electrodeless plasma torch including an inductive heating coil which encloses the flow channel coaxially. An injection pipe is disposed in a central manner in the flow channel extending up or into to the heating zone, wherein the injection pipe is enclosed by a gas guiding pipe coaxially and at a radial distance. An annular channel is arranged between the injection pipe and the wall of the flow channel for supplying a cooling gas.

5 Claims, 2 Drawing Sheets

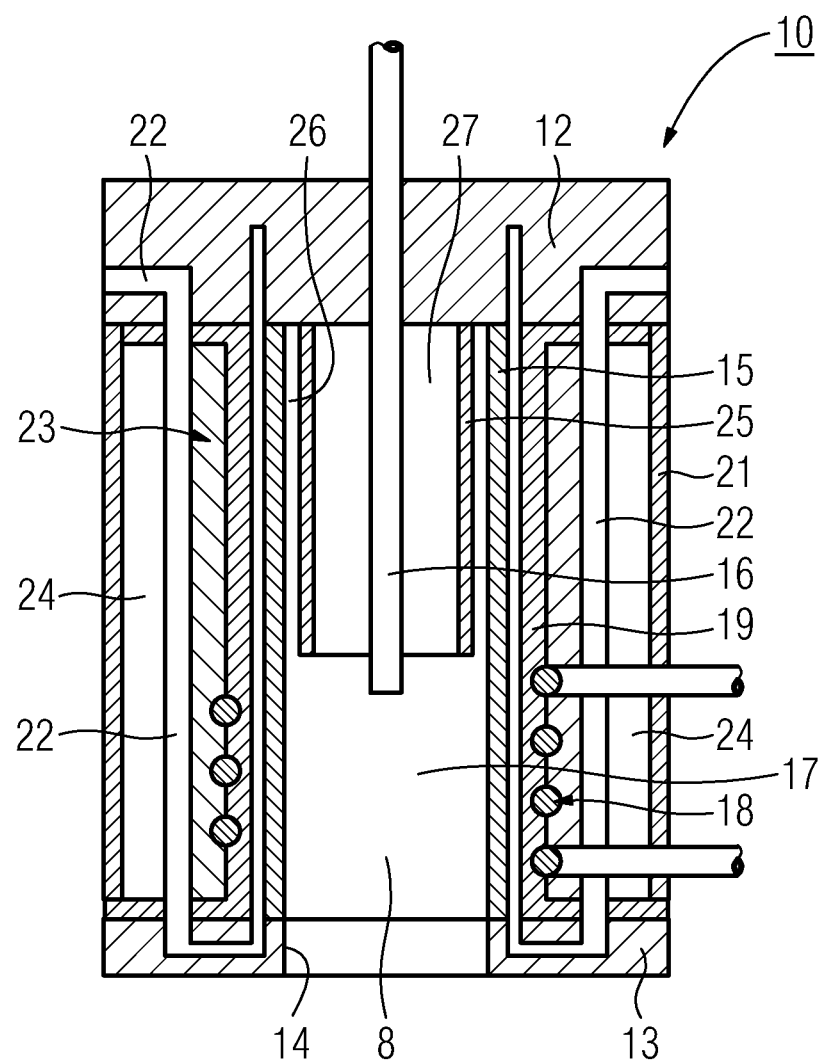

METHOD AND FURNACE FOR MELTING STEEL SCRAP

CROSS REFERENCE TO RELATED APPLICATIONS

This application is a divisional application of U.S. Pat. No. 8,137,432 filed Dec. 18, 2008, and issued Mar. 20, 2012. The U.S. Pat. No. 8,137,432 is the US national stage of International application no. PCT/EP2007/055649 filed Jun. 8, 2007, and claims the benefit thereof. The International application claims the benefits of German application no. 10 2006 029 724.5 DE filed Jun. 28, 2006. All of the applications are incorporated by reference herein in their entirety.

FIELD OF INVENTION

The invention relates to a method for melting steel scrap and a melting furnace suitable for this purpose. A large proportion of the industrial steel required is produced by smelting scrap by supplying electrical energy, with fossil energy sometimes also being introduced into the melt. The electrical energy is supplied with the aid of electrodes that are generally made of carbon, with arcs being generated between these and the melting bath. Electrode material is consumed in this process, making steel production expensive.

SUMMARY OF INVENTION

An object of the invention is to propose an alternative method for smelting steel scrap and a melting furnace suitable for this purpose which in particular allow economical steel production.

This object is achieved by a method and a melting furnace as claimed in the claims. According to the method a working gas is blown into the furnace by way of a flow channel to supply melting energy and in this process is guided through at least one electrodeless plasma torch, the plasma being produced by at least one inductive heating coil, which encloses the flow channel coaxially and forms a heating zone. Such a method does not require electrodes, which can wear out and increase production costs. The steel scrap is heated to the molten state by the gas introduced into the interior of the furnace flowing through the alternating electrical field of an induction coil, with the strength of the field being selected so that gas penetration and plasma formation take place even without ignition or pilot electrodes. The gas flow causes the plasma to be applied to the material to be melted, causing it to be heated and smelted.

In a preferred variant of the method the working gas, which is air, oxygen-enriched air, nitrogen, oxygen, etc., is supplied to the center of the heating zone by way of an injection pipe extending in a central manner in the flow channel. The central supply of gas means that a cooling gas can be guided through the peripheral region of the flow channel, to protect the wall enclosing the flow channel from too high a level of overheating, particularly in the region of the heating zone. A gas corresponding to the working gas can be used as the cooling gas for example.

In steel production dusts containing metallic and/or oxidic particles occurring in iron and steel production are frequently used. In one preferred variant of the method this happens quite simply in that metallic and/or oxidic dust particles are mixed in with a gas guided through the plasma torch. This has the advantage that no additional apparatus is necessary for the purpose. When dust particles are blown in, the problem can arise that they disrupt the melting process by causing the slag to cool down for example. However because the dust particles are guided through the plasma torch, they are heated, in which process they may become molten or even gaseous, favoring a homogenous mixing with the melt. Also in such states they are highly reactive, so they can be reduced by adding a reduction agent such as coal dust to the metal at the same time. To maintain a stable plasma, it is expedient for the dust particles to be supplied to the heating zone by means of a gas flow that is separate from the working gas flow. This allows the working gas flow to be set to control the plasma, regardless of the quantity of particles supplied.

The gas and/or plasma can be supplied in principle through any wall region of the melting furnace above the steel melt. However a side wall of the furnace is preferably selected. This has the advantage that loading can take place by way of the top opening, without the energy supply having to be interrupted, which reduces furnace productivity. The lateral energy supply also means that the energy is distributed more evenly to the melt material.

With the melting furnace heating facilities are provided, which extend through a wall of the furnace, which can be a side wall or a top region, with the heating facilities supplying melting energy. A heating facility comprises a tubular body, which encloses a flow channel. A longitudinal section of the body is configured as an electrodeless plasma torch, having an inductive heating coil, which encloses the flow channel coaxially and forms a heating zone. An injection pipe extending up to the heating zone or into it is preferably present in a central position in the flow channel to supply a working gas. A separate channel serving to supply a gas containing dust particles is formed in that the injection pipe is enclosed by a gas supply pipe coaxially and at a radial distance. The gas supply pipe is dimensioned so that an annular channel remains free between it and the wall of the flow channel. A cooling gas can be guided through this to protect the heating facility from overheating, particularly in the region of the heating zone. As an additional measure it is advantageous if the wall of the flow channel is enclosed by a cooling body on the outside, particularly in the region of the heating zone. To increase productivity it is expedient if a heating facility does not extend through the top but through the side wall region of the furnace.

BRIEF DESCRIPTION OF THE DRAWINGS

The invention is described in more detail below with reference to the accompanying drawings, in which:

FIG. 3 shows a schematic longitudinal section through the plasma torch of a heating facility.

DETAILED DESCRIPTION OF INVENTION

Figure 1:
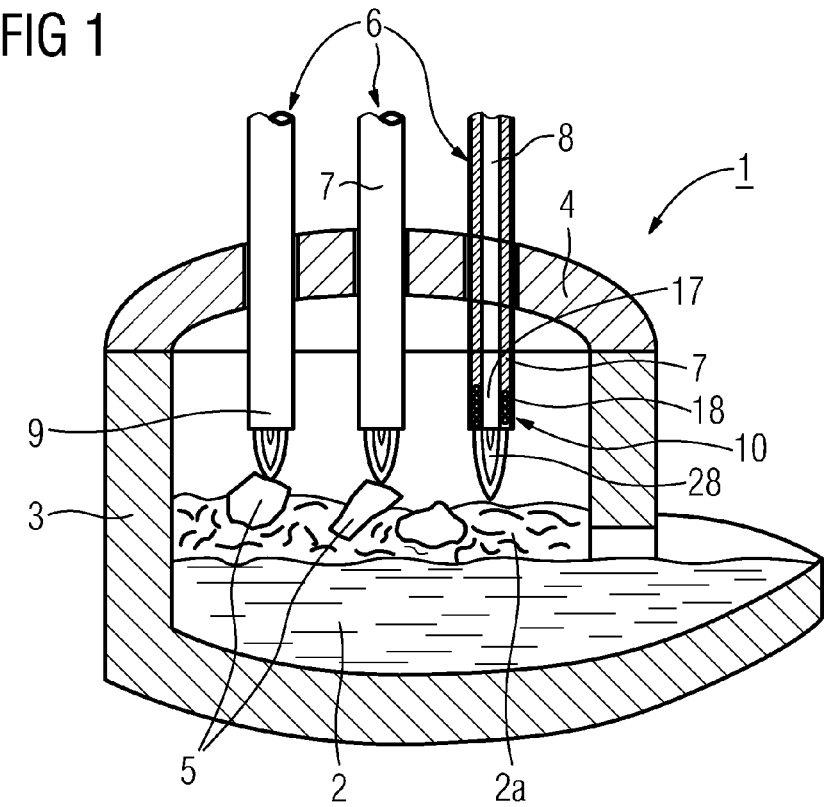
FIG. 1 shows a schematic sectional diagram of a melting furnace, in which heating facilities are guided through the top of the furnace.
Figure 2:
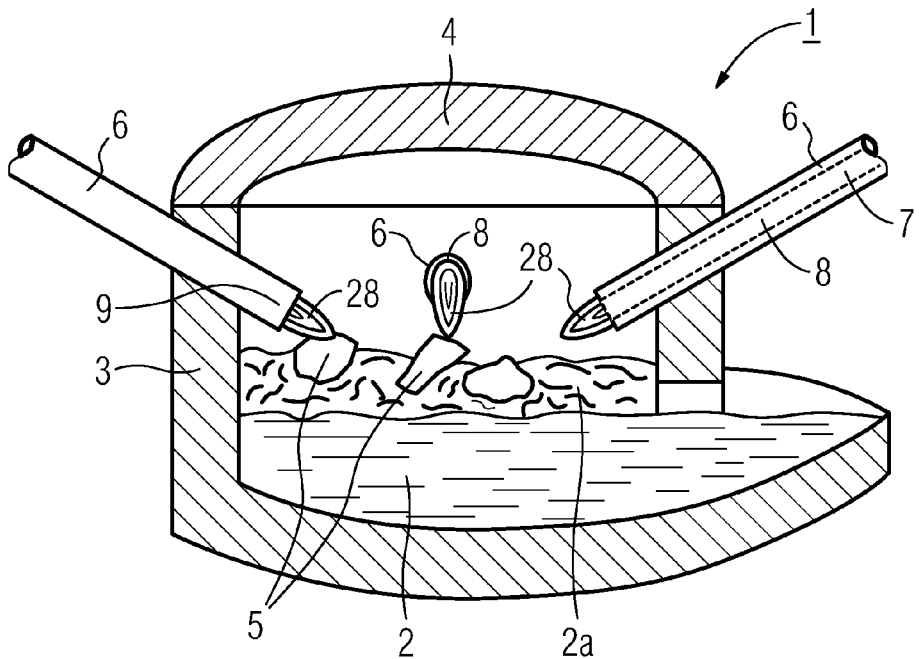
FIG. 2 shows a melting furnace in a diagram corresponding to FIG. 1, in which heating facilities are guided through a side wall.

FIGS. 1 and 2 respectively show a melting furnace 1, having a lower region accommodating a steel melt 2, a side wall 3 and a top 4. During operation slag 2a forms on the steel melt 2. Pieces of scrap 5 are shown in the slag 2a, being introduced into the furnace when the top 4 was removed. In the exemplary embodiment in FIG. 1 three heating facilities 6 extend through the top 4. Each heating facility comprises a tubular body 7, through which a flow channel 8 extends in the axial direction. In the exemplary embodiment in FIG. 2 a number of heating facilities 6 distributed over the periphery of the furnace extend through the side wall of the melting furnace 1. In this embodiment the top 4 can be opened to load the interior of the furnace with pieces of scrap 5, it being possible for the heating facilities 6 to remain in operation.

In the exemplary embodiments according to FIGS. 1 and 2 the heating facilities 6 are configured in an essentially identical manner. The tubular bodies 7 support an electrodeless plasma torch 10 at their ends 9 facing the interior of the furnace or disposed in the furnace. This plasma torch 10 is essentially a part in the form of a section of pipe, supporting a plate, namely a sparger 12, at the top. Below, in other words on the side facing the interior of the furnace or a metal melt 2 present there, it supports a cover plate 13, through which a central outlet opening 14 extends. The flow channel 8 of the tubular body 7 continues by way of holes (not shown) in the sparger 12 into the interior of an envelope pipe 15 made of a ceramic material for example and extending from the sparger 12 to the cover plate 13. An injection pipe 16 is disposed in a central manner in the flow channel 8, extending in its longitudinal direction, passing through the sparger 12 and extending up to a heating zone 17 of the plasma torch 10. The heating zone 17 is formed by an inductive heating coil 18, which encloses the heating zone 17 or the section of the flow channel 8 there coaxially. The heating coil 18 is secured to a coil support 19, which encloses the envelope pipe 15 coaxially. The coil support 19 is part of a cooling body 23, through which water channels 22 extend. Parts of the water channels 22 also extend into the sparger 12 and into the cover plate 13. A space 24 in the form of a hollow cylinder adjoins the peripheral wall 21 of the cooling body 23 in a radially inward manner, with an insulating gas enclosed therein.

A working gas, for example air, is supplied to a central region of the heating zone 17 by way of the injection pipe 16. The injection pipe 16 is enclosed by a gas guiding pipe 25 coaxially and at a radial distance. The gas guiding pipe 25 is dimensioned so that an annular channel 26 is formed between it and the envelope pipe 15. A cooling gas can be supplied through the annular channel 26 by way of a hole (not shown) in the sparger 12, said cooling gas flowing along the inside wall of the envelope pipe 15 and protecting it from overheating. As well as forming an annular channel 26 serving to supply a cooling gas, the gas guiding pipe 25 also serves to supply a carrier gas laden with dust particles to the heating zone 17 or a plasma present there. The plasma has a thermal output of up to 100 MW and can be regulated in a temperature range up to 12,000 K. The particles can be heated to a molten or vaporous state and are introduced together with the plasma flame 28 leaving the outlet opening 14 into the slag 3 or the metal melt 2.

The invention claimed is:

1. A melting furnace for smelting scrap, comprising:
 a lower region for collecting a steel melt;
 a side wall;
 a top;
 at least two hearing devices for supplying melting energy, wherein each heating device comprises:
  a tubular body, which encloses a flow channel;
  an electrodeless plasma torch with an inductive heating coil, wherein the inductive heating coil forms a heating zone which encloses the flow channel coaxially;
  an injection pipe disposed in a central manner in the flow channel extending up or into to the heating zone, wherein the injection pipe is enclosed by a gas guiding pipe coaxially and at a radial distance; and
  an annular channel between the injection pipe and a wall of the flow channel for supplying a cooling gas,
 wherein the at least two heating devices extend through the top or through the side wall of the melting frame.

2. The melting furnace as claimed in claim 1, wherein the wall of the flow channel is enclosed by a cooling body on the outside, at least in the region of the heating zone.

3. The melting furnace as claimed in claim 2, wherein at least one heating device extends through the side wall of the furnace.

4. The melting furnace as claimed in claim 1, wherein at least one heating device extends through the side wall of the furnace.

5. The melting furnace as claimed in claim 1, wherein the at least two heating devices extend through the side wall distributed over the circumference of the furnace.

\* \* \* \* \*